United States Patent [19]
Mottier

[11] Patent Number: 6,040,683
[45] Date of Patent: Mar. 21, 2000

[54] BATTERY CHARGER WITH ACTIVE FEEDBACK VOLTAGE CONTROLLER

[75] Inventor: Matthew D. Mottier, Lake Zurich, Ill.

[73] Assignee: Motorola, Inc., Schaumburg, Ill.

[21] Appl. No.: 09/322,093

[22] Filed: May 28, 1999

[51] Int. Cl.[7] .................................. H02J 7/04; H02J 7/16
[52] U.S. Cl. .............................................................. 320/137
[58] Field of Search ..................... 320/128, 132, 320/134, 136, 137, 150, 152, 162, 163, 164

[56] References Cited

U.S. PATENT DOCUMENTS

| | | |
|---|---|---|
| 5,130,634 | 7/1992 | Kasai . |
| 5,481,174 | 1/1996 | Martin et al. . |
| 5,498,950 | 3/1996 | Ouwerkerk . |
| 5,587,649 | 12/1996 | Garrett . |
| 5,691,620 | 11/1997 | Nagai et al. . |
| 5,703,470 | 12/1997 | Baranowski et al. . |
| 5,818,199 | 10/1998 | Beard . |

*Primary Examiner*—Edward H. Tso
*Attorney, Agent, or Firm*—Sylvia Chen

[57] ABSTRACT

A battery charger (100) with active feedback voltage controller includes a pass device (144), such as a metal-oxide-semiconductor field-effect transistor (MOSFET), and uses either hardware, software, or a combination of hardware and software, to implement an active feedback voltage controller (130). The active feedback voltage controller (130) reduces the control voltage to a tracking regulator (110) which in turn reduces the power dissipation of the pass device (144) and allows for a smaller pass device to be implemented in the battery charger (100) while maintaining the desired charging current as determined by a current controller (120). With software flexibility, many types of batteries can be efficiently charged to capacity, including nickel-cadmium (NiCad), nickel-metal-hydride (NiMH), and lithium-ion (LiIon) batteries.

14 Claims, 4 Drawing Sheets

BATTERY CHARGER WITH ACTIVE FEEDBACK VOLTAGE CONTROLLER

FIELD OF THE INVENTION

This invention relates generally to battery chargers, and more particularly to limiting power dissipation in battery chargers that use a pass device.

BACKGROUND OF THE INVENTION

Portable electronic devices, such as radiotelephones, currently use batteries as their main power source. Adapters, such as hands-free adapters, mobile transceiver adapters, cigarette lighter adapters, or wall charger adapters, can be connected to a vehicle cigarette lighter or an electrical outlet to provide an external power source for charging a battery attached to the portable electronic device. Many of these portable electronic devices use internal battery chargers to decrease the size of the adapters and increase convenience to the user.

In one type of internal battery charger, called a series pass charger, a linear switch pass device such as a metal-oxide-semiconductor field-effect transistor (MOSFET) is connected between a regulator and the battery. When a battery is charging, the power dissipated by the pass device is equal to the difference between the input and output voltages of the pass device multiplied by the maximum charging current. When a battery is deeply discharged, the battery voltage, which is the voltage at the output of the pass device, is much less than the regulator voltage, which is the voltage at the input of the pass device. During this condition, the power dissipated by the pass device could exceed maximum power ratings of typical device packages found in portable electronic devices. During a period of high power dissipation by the pass device, excess heat is generated and the overall efficiency of the battery charger is very poor.

Some internal battery chargers use an external tracking regulator physically located in the adapter to limit power dissipation in the charger's pass device. The tracking regulator provides a voltage that is a constant positive offset from the voltage of the battery being charged, thus holding the difference between the input and output voltages of the pass device relatively constant. When charging the battery, a microprocessor creates a control voltage proportional to a desired charging current, which controls the pass device (e.g., the gate of the MOSFET). The actual charging current is measured by a feedback loop that senses a voltage drop across a sense resistor, scales it, and compares it to the control voltage.

Even the use of an external tracking regulator, however, does not sufficiently reduce the power dissipation of an internal battery charger under certain conditions. For example, when the internal battery charger is implemented in a very small radiotelephone, the package of the pass device may be too small to properly dissipate the heat created by the pass device. Using a larger pass device package would make heat dissipation more efficient, but the drawback is that a larger package would make it difficult to fit the internal battery charger into the very small radiotelephone. Thus, it would be advantageous to further limit power dissipation in the internal battery charger to allow a reduction in the size of the pass device.

DETAILED DESCRIPTION OF THE PREFERRED EMBODIMENTS

A battery charger with active feedback voltage controller includes a pass device, such as a metal-oxide-semiconductor field-effect transistor (MOSFET), and implements an active feedback voltage controller to control a tracking regulator voltage supply and reduce power dissipation in the pass device. Instead of using an actual battery voltage to control the tracking regulator directly, an active feedback voltage controller uses a fraction of the actual battery voltage, yet maintains the charging current required by a current controller. The fraction varies depending on the desired charging current as determined by the current controller, and other factors, such as the ambient temperature sensed by a battery thermistor, the actual battery voltage, or the battery type. In two embodiments of the active feedback voltage controller, a gate control line for a MOSFET pass device is connected to a BJT in the active feedback voltage controller to reduce the control voltage to the tracking regulator. In another embodiment of the active feedback voltage controller, a microprocessor directly controls the tracking regulator depending on the desired charging current and other factors, such as the actual battery voltage, the calculated present charging current, or the ambient temperature sensed by a battery pack thermistor.

The active feedback voltage controller may include hardware, software, or a combination of hardware and software. The active feedback voltage controller reduces the control voltage to the tracking regulator which in turn reduces the power dissipation of the pass device, and it allows for a smaller pass device to be implemented in the battery charger while maintaining the desired charging current as determined by the current controller. With software flexibility, many types of batteries can be efficiently charged to capacity, including nickel-cadmium (NiCad), nickel-metal-hydride (NiMH), and lithium-ion (LiIon) batteries, while reducing power dissipation.

Figure 1:
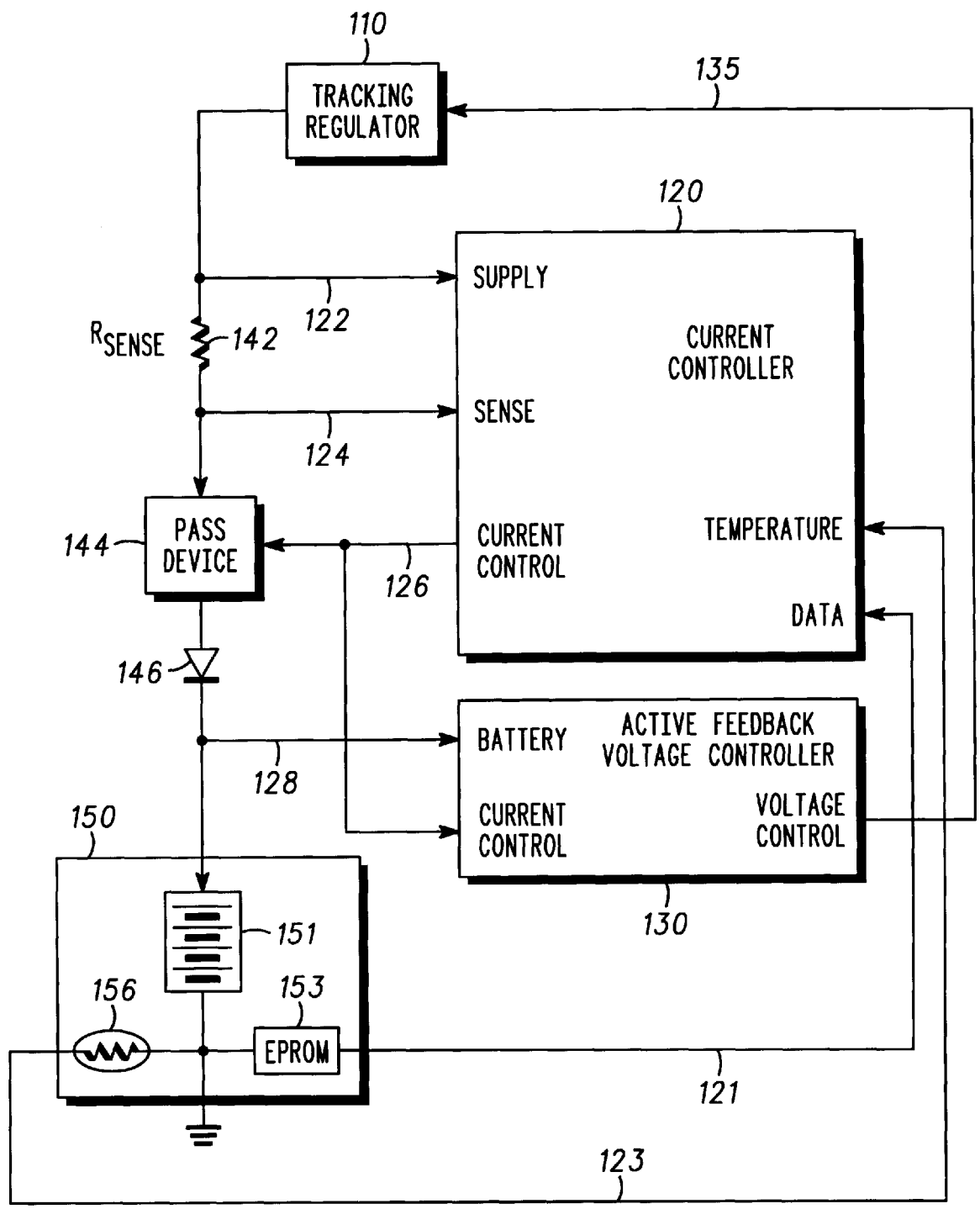
FIG. 1 shows a block diagram of a battery charger with active feedback voltage controller according to a preferred embodiment.

FIG. 1 shows a block diagram of a battery charger 100 with active feedback voltage controller 130 according to a preferred embodiment. A tracking regulator 110 provides a supply voltage that is a constant DC offset from a control voltage on a voltage control feedback line 135. A current controller 120 calculates a present charging current to a battery pack 150 using a voltage at a supply line 122 and a voltage at a sense line 124 on either side of a sense resistor 142 ($I=(V_{supply}-V_{sense})/R_{sense}$). There are various alternate methods of determining the present charging current, including placing the sense resistor could be placed in another location.

After the present charging current is determined, the current controller 120 establishes a current control value based on the present charging current and stored charging rates from either a memory in the current controller itself or from a data storage device 153, such as an EPROM, associated with a battery pack 150. A data line 121 can send the current controller 120 additional information on data line 121, such as the battery type and the battery charging table, from a data storage device, such as an EPROM 153, usually found in a battery pack 150. The current controller 120 can also receive ambient temperature information on temperature line 123 from a thermistor 156, which is built into most battery packs. The current control value determined from the present charging current, stored charging rates, and data and temperature information as available, is used to control the pass device 144, which charges battery cells 151 in the battery pack 150 through a diode 146. In this implementation, the current control value is expressed as a voltage on the current control line 126.

An active feedback voltage controller 130 also receives the current control value from current control line 126 as well as the actual battery voltage on battery line 128. Using this information, the active feedback voltage controller 130 determines a voltage control value and expresses that value as a voltage on a voltage control feedback line 135 to the tracking regulator 110. The tracking regulator produces an output voltage that is a constant positive offset from the voltage on the voltage control feedback line 135. The active feedback voltage controller 130 is designed to provide the minimum voltage on the voltage control feedback line 135 needed to obtain the charging current specified by the current controller 120. By using the minimum voltage on the voltage control feedback line 135, the power dissipation of the battery charger 100, and especially the pass device 144, can be reduced. This reduces the thermal dissipation of the battery charger and may allow the package of the pass device 144 to be physically smaller.

Figure 2:
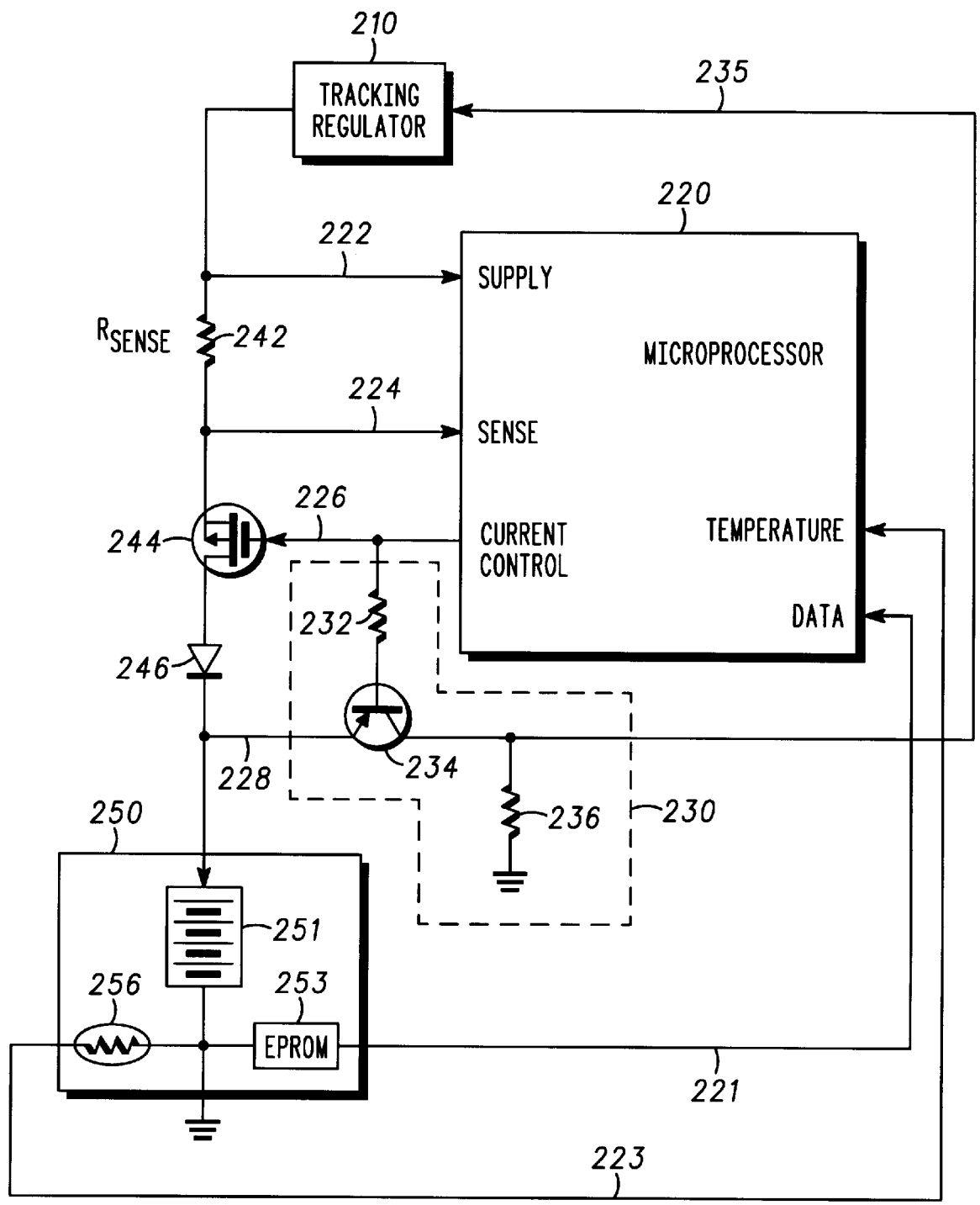
FIG. 2 shows a battery charger with active feedback voltage controller according to a first preferred embodiment.

FIG. 2 shows a battery charger 200 with active feedback voltage controller 230 according to a first preferred embodiment. In this embodiment, the active feedback voltage controller 230 is implemented using hardware components, namely a PNP bipolar junction transistor (BJT) 234 and two resistors 232, 236. The two resistors 232, 236 compensate for manufacturer variations in the input impedance of the tracking regulator 210. The current controller 120 shown in FIG. 1 is implemented using a microprocessor 220 which calculates the present charging current from a voltage on a supply line 222, a voltage on a sense line 224, and a known value of a sense resistor 242. The microprocessor 220 then determines the desired current control value and uses a current control line 226 to vary the voltage at the gate of the MOSFET pass device 244 to charge battery cells 251 in a battery pack 250 through a diode 246.

The calculation of the current control value can include variables for ambient temperature as determined by a thermistor 256 and transmitted by temperature line 223 to the microprocessor 220 and battery type and battery charging table information from an EPROM or other type of data storage device 253 sent through data line 221.

The current control line 226 is also connected to the base of the BJT 234 through a resistor 232. The value of the resistor 232 is selected to optimize the entire battery charger 200. The emitter of the BJT 234 is connected to the battery pack 250 using battery line 228, and the collector of the BJT 234 is connected to the tracking regulator 210 using voltage control feedback line 235. As the voltage on the current control line 226 increases, the BJT 234 decreases the voltage on the voltage control feedback line 235 relative to the actual battery voltage on battery line 228. When the voltage on the voltage control feedback line 235 is so low as to cause the microprocessor 220 to increase the voltage on the current control line (due to a change in the present charging current), the BJT 234 allows the voltage on the voltage control feedback line 235 to increase. This control system should settle down to a steady state that achieves the required charging current as calculated using sense resistor 242 and minimizes the power dissipation of the MOSFET pass device 244. During equilibrium, the MOSFET pass device 244 is generally driven at saturation to decrease power dissipation, and the BJT 234 is generally driven in linear mode or at saturation.

Under certain circumstances, the battery charger 200 may oscillate due to the fact that the current controller implemented by the microprocessor 220 and the active feedback voltage controller 230 have different response times. This oscillation can be remedied using a delay circuit to slow the response time of the faster control loop, which in this case is the active feedback voltage controller 230. For a LiIon battery charger, this delay circuit could be implemented using the thermistor 256 and a variable capacitor.

Figure 3:
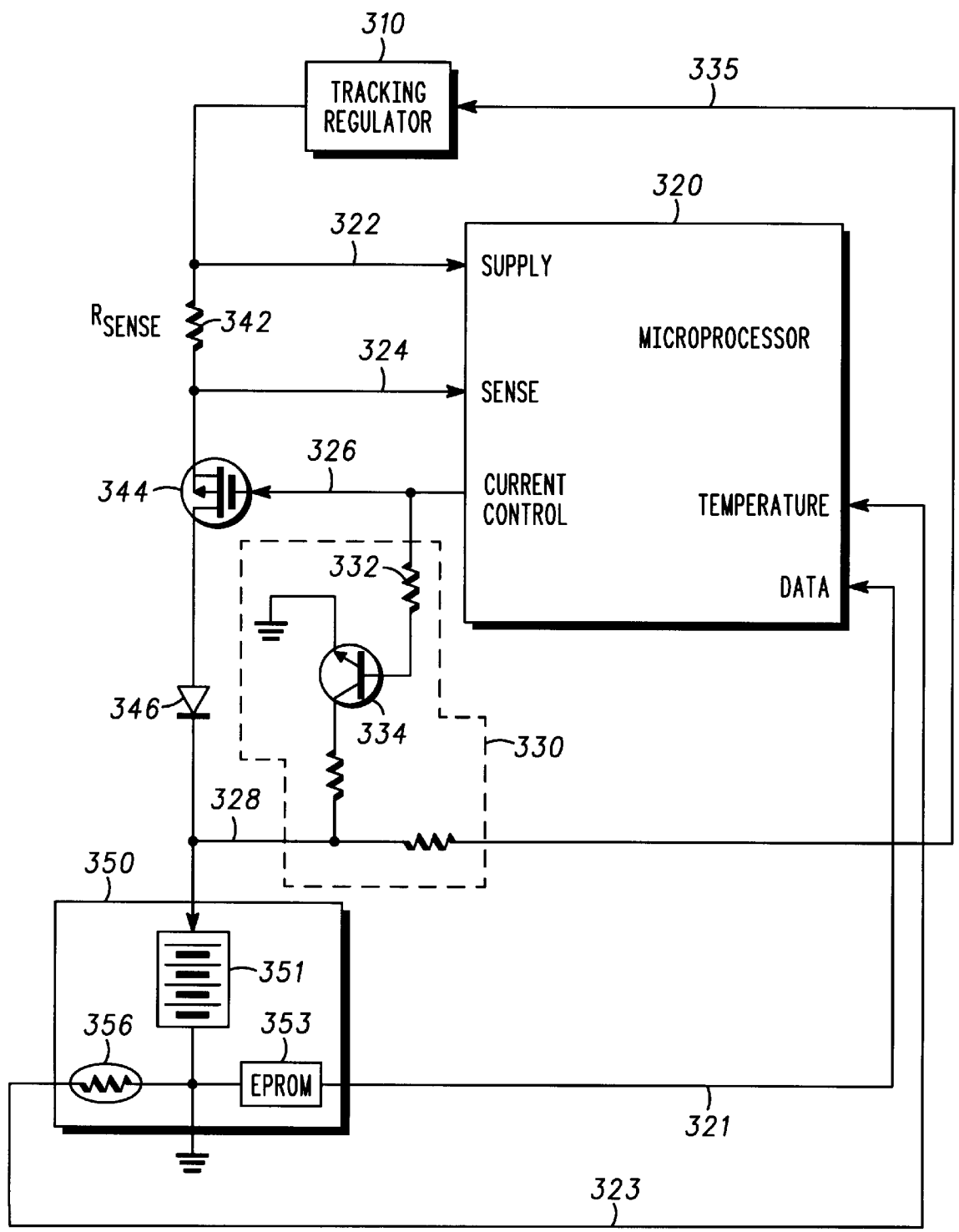
FIG. 3 shows a battery charger with active feedback voltage controller according to a second preferred embodiment.

FIG. 3 shows a battery charger 300 with active feedback voltage controller according to a second preferred embodiment. The active feedback voltage controller 330 is also implemented using hardware components, specifically an NPN BJT 334 is used in a linear mode to create a variable resistor. The current controller 120 shown in FIG. 1 is implemented using a microprocessor 320 which calculates the present charging current from a voltage on a supply line 322, a voltage on a sense line 324, and a known value of a sense resistor 342. The microprocessor 320 then determines the desired current control value and uses a current control line 326 to vary the voltage at the gate of the MOSFET 344 pass device to charge battery cells 351 in a battery pack 350 through a diode 346.

The calculation of the current control value can include variables for ambient temperature as determined by a thermistor 356 and transmitted by temperature line 323 to the microprocessor 320 and battery type and battery charging table information from a data storage device 353 as sent through data line 321.

The current control line 326 is also connected to the base of the BJT 334 through a resistor 332. The value of the resistor 332 is selected to optimize the entire battery charger 300. The emitter of the BJT 334 is connected to ground, and the collector of the BJT 334 is connected to the battery pack 350 through battery line 328 and the tracking regulator 310 through voltage control feedback line 335. When the voltage on the current control line 326 is high, the charger MOSFET pass device 344 is mostly off, and it is desirable to lower the voltage on the voltage control feedback line 335 relative to the actual battery voltage on the battery line 328. As the voltage on the voltage control feedback line 335 is lowered, the BJT 334 will begin to turn off. An equilibrium will eventually be reached between the MOSFET pass device 344 and the BJT 334, and thus the power dissipation can be minimized. Note that this approach, however, cannot adapt to major manufacturer variances in the tracking regulator 210 input impedance.

Under certain circumstances, the battery charger 300 may oscillate due to the fact that the current controller implemented by the microprocessor 320 and the active feedback voltage controller 330 have different response times. This oscillation can be remedied using a delay circuit to slow the response time of the faster control loop, which in this case is the active feedback voltage controller 330. For a LiIon battery charger, this delay circuit could be implemented using the thermistor 356 and a variable capacitor.

Figure 4:
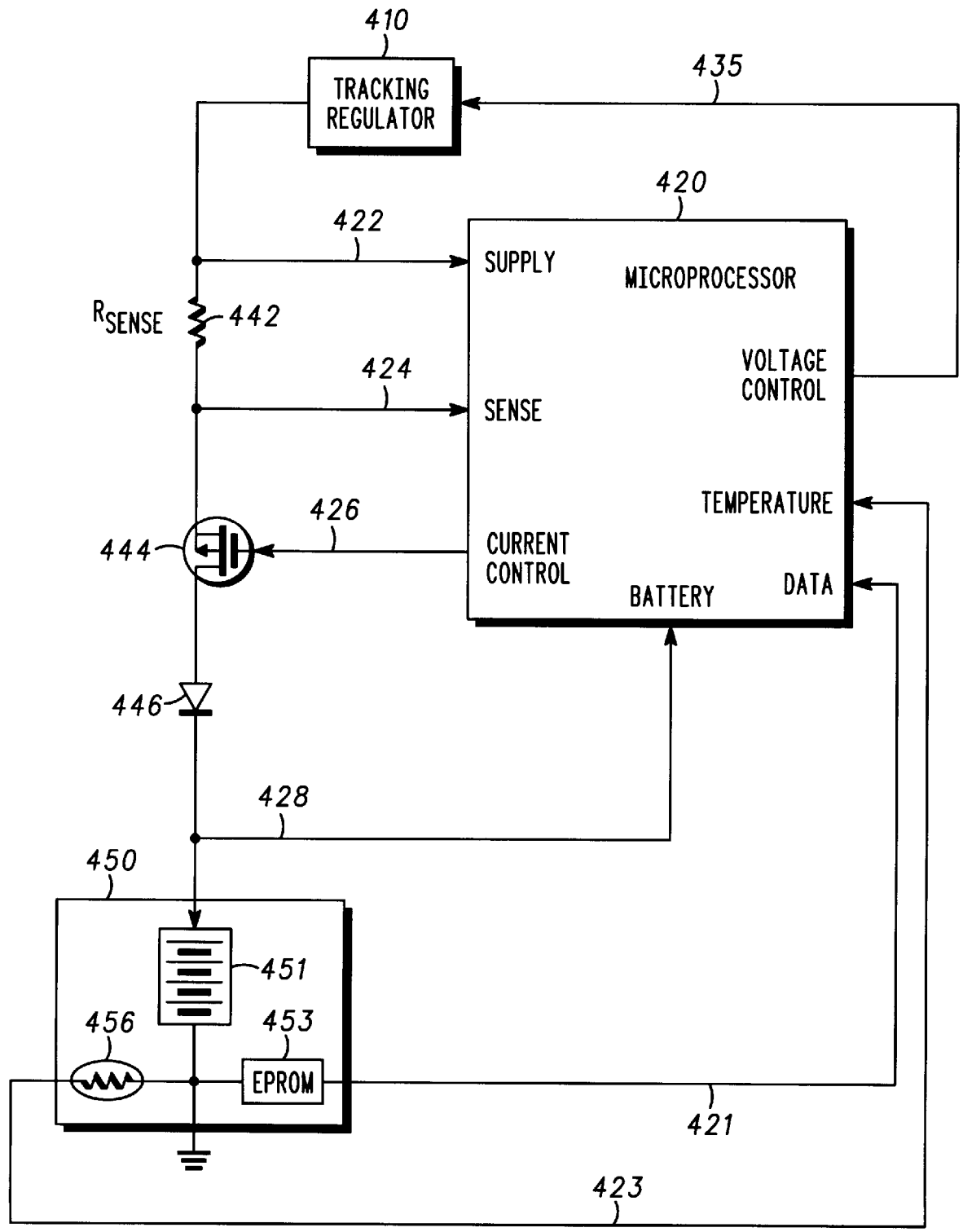
FIG. 4 shows a battery charger with active feedback voltage controller according to a third preferred embodiment.

FIG. 4 shows a battery charger 400 with active feedback voltage controller according to a third preferred embodiment. In this approach, both the charger controller and the active feedback voltage controller are implemented in a microprocessor 420. This eliminates the potential for oscillation, because the microprocessor 420 directly controls both the voltage on the current control line 426 and the voltage on the voltage control feedback line 435. The microprocessor 420 calculates the present charging current from a voltage on a supply line 422, a voltage on a sense line 424, and a known value of a sense resistor 442. The microprocessor 420 then determines the desired current control value and uses a current control line 426 to vary the voltage at the gate of the MOSFET pass device 444 to charge the battery cells 451 in a battery pack 450 through a diode 446. The current control value can also depend upon information from a thermistor 456 in the battery pack 450 as conveyed through a temperature line 423 or information from a data storage device 453, such as an EPROM, sent through data line 421.

The microprocessor 420 also receives an actual battery voltage on battery line 428 and determines the proper voltage to put on voltage control feedback line 435 going to the tracking regulator 410. This voltage is preferably determined using a mathematical formula; however, a table or particular parameters can be used to set the voltage on voltage control feedback line 435. A simple algorithm would stepwise increase the voltage on the voltage control feedback line 435 if the present charging current is less than the desired current control value, stepwise decrease the voltage on the voltage control feedback line 435 if the present charging current is greater than the current control value, and also stepwise decrease the voltage on the voltage control line if the present charging current is approximately equal to the current control value.

Thus, a battery charger with active feedback voltage controller actively reduces the feedback voltage to a tracking regulator, which in turn reduces power dissipation in a pass device. While specific components and functions of the battery charger with active feedback voltage controller are described above, fewer or additional functions could be employed by one skilled in the art within the true spirit and scope of the present invention. The invention should be limited only by the appended claims.

I claim:

1. A battery charger with active feedback voltage controller comprising:
    a pass device configured for connection between a tracking regulator and a battery pack;
    a current controller, coupled to the pass device, for determining a present charging current going to the battery pack and determining a current control value for controlling the pass device based on the present charging current; and
    an active feedback voltage controller, coupled to the current controller and configured for connection to the tracking regulator and the battery pack, for receiving the current control value and an actual battery voltage and determining a voltage control value to control an output voltage of the tracking regulator based on the current control value and an actual battery voltage.

2. A battery charger according to claim 1 wherein the active feedback voltage controller comprises:
    a hardware feedback loop.

3. A battery charger according to claim 2 wherein the active feedback voltage controller further comprises:
    an PNP bipolar junction transistor.

4. A battery charger according to claim 3 wherein a base of the PNP bipolar junction transistor is coupled to receive a voltage representing the current control value, an emitter of the PNP bipolar junction transistor is coupled to the battery pack, and a collector of the PNP bipolar junction transistor is coupled to the tracking regulator.

5. A battery charger according to claim 2 wherein the active feedback voltage controller further comprises:
    an NPN bipolar junction transistor.

6. A battery charger according to claim 5 wherein a base of the NPN bipolar junction transistor is coupled to receive a voltage representing the current control value, an emitter of the NPN bipolar junction transistor is coupled to ground, and a collector of the NPN bipolar junction transistor is coupled to the battery pack and the tracking regulator.

7. A battery charger according to claim 1 wherein the active feedback voltage controller comprises:
    a software feedback loop.

8. A battery charger according to claim 1 wherein the current controller comprises:
    a temperature sense input configured for connection to a thermistor.

9. A battery charger according to claim 1 wherein the current controller comprises:
    a data input configured for connection to a data storage device.

10. A battery charger with active feedback voltage controller comprising:
    a pass device having an input configured for connection to a tracking regulator and an output configured for connection to a battery pack; and
    a controller, coupled to the pass device, having:
        a means for determining a present charging current going to the battery pack and determining a current control value;
        a current control line, coupled to a gate of the pass device, for using the current control value to control the pass device;
        a battery line, coupled to the battery pack, for sensing an actual battery voltage; and
        a voltage control feedback line, configured for connection to the battery pack and the tracking regulator, for controlling an output voltage of the tracking regulator based on the current control value and the actual battery voltage.

11. A battery charger with active feedback voltage controller according to claim 10 further comprising:
    a sense resistor having a resistance value, coupled between the tracking regulator and the pass device, wherein the means for determining a present charging current calculates the present charging current by dividing a voltage drop across the sense resistor by the resistance value.

12. A battery charger with active feedback voltage controller according to claim 10 wherein the controller further comprises:
    a temperature sense input for connection to a thermistor.

13. A battery charger with active feedback voltage controller according to claim 10 wherein the controller further comprises:
    a data input for connection to a data storage device.

14. A method for charging a battery comprising the steps of:
    coupling a tracking regulator to a pass device;
    coupling the pass device to the battery;
    determining a present charging current going to the battery;
    computing a current control value;
    sensing an actual battery voltage of the battery;
    increasing a voltage on a voltage control feedback line relative to the actual battery voltage when the present charging current is less than the current control value;
    decreasing a voltage on the voltage control feedback line relative to the actual battery voltage when the present charging current is greater than the current control value; and
    decreasing a voltage on the voltage control feedback line relative to the actual battery voltage when the present charging current is approximately equal to the current control value.

* * * * *